Sept. 25, 1973   F. D. HOFFERT   3,761,244
PROCESS FOR THE CONTROLLED REDUCTION OF IRON
ORES IN A HELICAL HEATING ZONE
Filed July 19, 1971
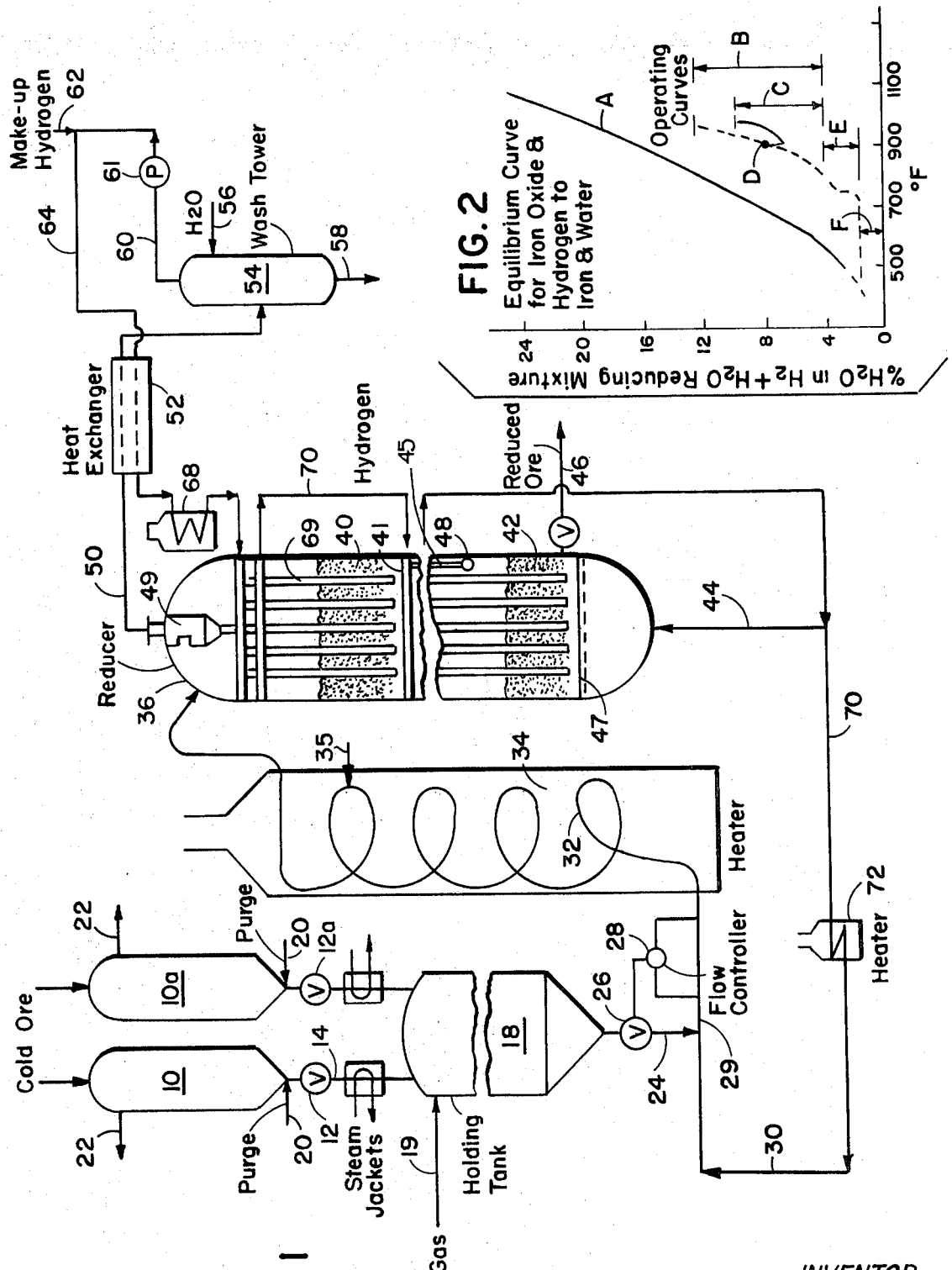
INVENTOR
Franklin D. Hoffert
ATTORNEY

3,761,244
PROCESS FOR THE CONTROLLED REDUCTION OF IRON ORES IN A HELICAL HEATING ZONE

Franklin D. Hoffert, Mountainside, N.J., assignor to Hydrocarbon Research, Inc., New York, N.Y.
Filed July 19, 1971, Ser. No. 163,688
Int. Cl. C21b 13/14
U.S. Cl. 75—26　　　　　　　　　　　　　　　4 Claims

ABSTRACT OF THE DISCLOSURE

Iron oxide containing ores are continuously reduced in an upflow fluidized bed hydrogenation process. The ore is continuously fed by hot reducing gas to the reaction zone, through a heater having a helical transfer line coil so that the iron ore is preheated to about 900° F. and partially reduced prior to entering the reaction zone.

BACKGROUND OF THE INVENTION

The reduction of iron oxide by the fluidized process described in U.S. Pats. 2,900,246 and 3,347,659, contemplates feeding the iron oxide containing ore to the upper bed of one or more fluidized beds through which hydrogen is upwardly passed with the ultimate removal of the reduced ore from a lower portion of the reducer and the removal of the water vapor from the top.

The reduction of iron oxide is an endothermic reaction. The heat required to maintain operating conditions is generally supplied by the upwardly flowing hydrogen gas. The prior art, U.S. Pats. 3,338,704; 3,364,010 and 3,364,111, discloses that substantial problems are encountered when one must heat the ore to reaction conditions. As stated in Porter 3,364,111:

"With reference to supplying the necessary heat for carrying out the endothermic reactions, it was found impractical to supply all the heat for the reduction by excessively preheating the ore feed because at extremely high temperature sintering, agglomeration, and defluidization of the fluidized bed of ore would occur. It is also impractical to supply all of the heat to the ferrous reduction zone by excessive preheating of the fresh reducing gases prior to feeding them to the reduction zone because of preheating equipment temperature limitation. Since enough heat cannot be added at the top nor at the bottom of the reducing operation, it is difficult to obtain the proper heating for the reduction process. This problem is partially solved by both preheating the recycle gas of the fresh gas thus supplying heat to the last or final stage of the reduction. However, satisfactorily supplying heat to the intermediate stages of the reduction process has been extremely difficult. Also, it has been difficult to control the reactions at the desired rates in the initial and final stages where it was necessary to overheat the ore in the initial stage or the reducing gas in the final stage. Without overheating it was found that the intermediate stages were deficient in the heat required to reduce the ores in this stage. The known processes of supplying heat to the reduction zones and for circulating or recycling reducing gases have proved to be inefficient and uneconomic to carry out commercial direct iron ore reduction. These processes also lack in flexibility of handling solids and gas contacting required to carry out in efficient process."

SUMMARY OF THE INVENTION

This invention relates to a process for continuously preheating and feeding iron oxide containing ores to a fluidized reducing zone. The ore in the presence of a heated reducing gas passes through a helical conduit in a fired heater to the reactor. The helical conduit in the fired heater is designed so that the reducing gas will transfer the iron ore at a rate that the slippage allows the ore to reach the desired degree of heating without requiring excessive heating of the reducing gas. This heating is sufficient such that the ore is pre-reduced from about 5 to 30 percent in the transfer to the reactor.

DESCRIPTION OF THE DRAWINGS

FIG. 1 is a schematic view of a process for the direct reduction of iron ore using a pre-reduction heating zone.

FIG. 2 is a graphical representation of the temperature increase advantages due to the removal of the water of hydration from the reducing mixture.

DESCRIPTION OF A PREFERRED EMBODIMENT

In FIG. 1, the cold ore is initially introduced to one or more hoppers 10, 10(a), from which it will flow by gravity feed under control of valves 12 and 12(a) through a steam jacketed line 14 into the holding tank 18. Preferably the hoppers 10 and 10(a) will contain around a total of a 24 hour supply of ore so that the discharge into the holding tank will maintain the level in the holding tank constant.

The hoppers 10 and 10(a) will be purged with gas at 20 which discharges at 22, such gas normally being nitrogen, to secure the removal of air and other contaminants from the ore.

By the time the ore has reached holding tank 18 it has been raised to approximately 250° F. This temperature is a convenient temperature for ease in operation so as to prevent freezing in winter, etc., and has no process significance.

The tank 18 is normally pressurized at 19 to discharge the ore into the line 24, having valve 26 controlled by a flow controller 28. This flow controller measures the pressure drop along a portion of the transfer line 29, and thereby controls the flow from line 24 by maintaining a constant density of ore in the transfer line 29.

The gas source for the transfer line 29, preferably, the reducing gas which is hereinafter discussed, is a reducing gas in the recycle line 30. At a temperature between 800° F. and 1500° F. and a pressure between 100 and 1000 p.s.i.g.

The transfer line 29 discharges the ore into a heating helix 32 which is preferably mounted in a fired heater 34, whereby the iron ore is continuously heated to the desired pre-reduction temperature before entering the reducer 36. The fired heater 34 externally heats helix 32 thereby supplementing the heat input from the transfer gas to the extent of 2,000 to 12,000 B.t.u./hr./sq. ft. Thus the transfer gas needs not be excessively heated. The reducer 36 is preferably of the type described in the U.S. Pat. 3,347,-659 issued to Volk et al.

A helix having a nominal diameter between 6 feet and 20 feet made of a suitable tube which itself is normally in the size range of 3 to 6 inches can be utilized to establish a desired slip factor. The "slip factor" is the ratio of the density of the ore within the coil to the density of the ore fed to the coil. For example, if the density of the ore in the coil is 5 lbs./cu. ft. of flowing gas and the density of the ore fed to the coil is 1 lb./cu. ft. of flowing gas, then the "slip factor" is 5. The slip factor used will depend upon the ore being used, the amount of pre-reduction required, the gas flow rate as well as other factors of the system.

The flow controller 28, is particularly advantageous for controlling the dilute phase loading on the prereduction system by measuring the pressure drop of a section of pipe upstream of the helix so that the instantaneous dilute phase loading at the inlet to the reaction system is maintained independently of the slip characteristics of the coil. Although the preferred embodiment maintains the slip factor by varying the ore feed in a constant gas flow, it is equally possible to maintain the slip factor by varying the gas flow with a constant ore feed.

The operation of the pre-reduction in the helix 32 is such that the ore undergoes at least a 5 percent degree of pre-reduction within the limits set by the equilibrium of reduction reactions such as $\frac{1}{4}Fe_3O_4+H_2=\frac{3}{4}Fe+H_2O$ and/or $Fe_2O_3+3H_2=2Fe+3H_2O$ at a temperature of at least 800° F.

For magnetite and hematite ores, it is sufficient to increase the temperature to about 900° F. which will accomplish about 5 to 15 percent pre-reduction.

For ilmenite and other ores, it is necessary to increase the temperature to approximately 1300° F. to accomplish ore reduction. Since the iron content of ilmenite ores is less than magnetite or hematite ores, the pre-reduction will occur to a greater extent, e.g. to 20–30 percent.

It is of particular importance to remove the water of hydration from iron ores prior to charging to a fluidized bed as for example, the top bed 40 of reducer 36, since the release of the water of hydration adversely affects the degree of reduction of iron as determined by reduction equilibria due to the inherent back-mixing in fluid beds. The co-current passage of hydrogen and ore through heater coil 32 thus permits this release of the water of hydration without adversely affecting the subsequent performance of the fluidized upper bed 40 in reducer 36. Therefore the efficiency of the upper bed 40 is remarkedly increased.

I have also found that the addition of dry hydrogen as at 35, directly to the helical heating tube 32 will create a dilution effect so that the difference between the equilibrium water content and the actual water content at such location can be controlled. The addition of dry hydrogen at 35 will decrease the percentage of water vapor in the reduction system by such a dilution effect.

In such a process the iron ore or oxide suitably dried and ground as hereinbefore mentioned to all pass a 10 mesh USS screen with no more than about 25 percent passing a 325 mesh screen and with about 25 percent and not to exceed 40 percent larger than 100 mesh, forms the upper bed 40 resting on a partition 41.

In turn by means of suitable downcomers 45, having valves 48 the ore or oxide will be sequentially moved downward to form beds such as 42 on lower partitions, such as shown at 47. These beds are maintained in a fluidized condition by the up-flow of the hydrogen entering at 44, it being understood that temperature and pressure conditions are appropriate for reduction.

Preferably, the pressures are in the range of about 200 to 650 p.s.i.g. and temperatures for a typical hematite, magnetite or mill scale are usually in the range of 600° F. to 1100° F., for ilmenite such as Quilon or McIntyre, the temperatures are normally in the range of 1300 to as high as 1650° F.

In a fluidized bed system the vapors are passed through a cyclone 49, which returns the solids to the upper bed with the gas removed at 50, and passed through heat exchanger 52 to the wash tower 54. In such tower, water is introduced at 56 and is removed at 58.

The scrubbed gas at 60 is conveniently compressed at 61 and blended with make up hydrogen at 62 to form the recycle hydrogen stream 64. This conveniently passes through the heat exchanger 52 and may be brought up to appropriate temperatures in the fired heater 68.

As described in the Stotler U.S. Pat. 2,805,144, the hydrogen may be passed through internal heat exchangers 69, in the respective ore beds to control the temperatures of the beds.

As more particularly shown in the Stotler patent, the hydrogen then passes as by the line 70 to lower heat exchange units 69 and is ultimately introduced into the base of the reactor through the line 44.

A part of the hydrogen in line 70 may be further heated in heater 72 to become the transfer gas in line 30.

After the desired extent of the reduction is accomplished in the lowermost bed 42, the reduced ore is removed through line 46 following which the downcomer valve 48 is opened to allow the upper bed to move to the lower bed for further reduction.

As previously discussed reduction of iron ores in a fluidized bed greatly benefits from having the water of hydration removed prior to reducing the ore in the top fluid bed zone 40. This benefit is demonstrated in FIG. 2 where curve A represents the equilibrium curve for iron oxide and hydrogen to iron and water in accordance with the equation: $\frac{1}{4}Fe_3O_4+H_2=\frac{3}{4}Fe+H_2O$.

Distance B represents the water formed by partial reduction of the iron oxide in the coil without the periodic injection of hydrogen; while distance C represents the water formed by partial reduction of the iron oxide with hydrogen injection. Point D is the point at which hydrogen is injected into the coil, distance E is the water of hydration that is released, while distance F is the water released in drying the ore.

From FIG. 2 one sees that the heated ore first dries and releases water in the amount F. As the temperature of the ore in the coil increases the ore then releases water of hydration to the extent E. The ore then begins to undergo partial reduction thereby forming water to the extent C or B. When hydrogen is introduced into the coil at D there is a shift in the operating curve that allows one to reach higher preheat temperatures with a lower percent of water in the reducing mixture as shown by comparing C and B.

It is, therefore, preferable to add hydrogen at several points along the coil to allow the higher pre-reduction temperatures of the ore with lower percentages of water being present. This substantially reduces the heat requirements in the fluid bed reduction zone.

OPERATING RANGES

| | Iron ore | Titaniferous ore |
|---|---|---|
| Fluidized bed temperature, °F | 900 | 1,400 |
| Preheated temperature, °F | 600–1,100 | 1,300–1,650 |
| Reduction, percent | 5–15 | 20–30 |
| Pressure: | | |
| P.s.i.g | 100–1,000 | 100–1,000 |
| Preferred | 200–600 | 200–600 |
| Slip factor | 1–5 | 1–5 |

NOTE.—Ore size (USS): All pass 100 mesh; average particle size, 200 mesh.

For many reasons, a reducing gas, largely hydrogen (more than 50 percent purity) is used. However, 70 percent hydrogen is preferred. This system enables one to reduce iron oxide containing ores without sintering, agglomeration or defluidization while obtaining a superior degree of reduction.

While I have shown and described a preferred form of the embodiment of my invention, it will be apparent to those skilled in the art that modifications may be made within the scope and spirit of the description herein and of the claims appended hereinafter.

I claim:

1. A method for the continuous heating and prereduction of a particulate iron oxide-containing ore with a hydrogen-containing reducing gas to produce some metallic iron which comprises:
   (a) grinding a hydrated iron-oxide containing ore to all pass 10 mesh with not more than 25 percent of the ore particles passing 325 mesh (U.S. Standard);
   (b) heating a reducing gas to a temperature in the range of 800° F. to 1500° F. under a pressure in the range of 100 to 1000 p.s.i.g.;
   (c) combining said particulate ore with said reducing gas;
   (d) feeding said ore and said gas upwardly through a substantially helical tubular heating zone;

(e) heating said ore to a temperature of at least 800° F. as said ore is transported in dilute phase suspension upwardly through said helical tubular heating zone by said gas;

(f) prereducing said ore in said helical tubular heating zone with said reducing gas and releasing water of hydration;

(g) injecting additional reducing gas comprising dry hydrogen to said helical tubular heating zone at a point where said prereduced ore releases the water of hydration to control and maintain a hydrogen to water vapor ratio that will permit the continued reduction of said iron ore wherein the release of the water of hydration from the ore would otherwise limit the degree of reduction by decreasing the reduction potential;

(h) removing a heated-prereduced ore wherein the iron oxides have undergone a 5 to 30 percent reduction to metallic iron.

2. The method of claim 1 wherein said ore of step (a) is a titaniferous ore and it is preheated to about 1300° F. with a prereduction to metallic iron of up to about 30 percent.

3. The method of claim 1 wherein said heated prereduced ore of step (h) is further reduced in multiple fluidized bed zones.

4. The method of claim 1 including the additional steps of:

(i) passing the partially reduced ore of step (h) from said helical tubular heating zone to a fluidized-bed reaction zone;

(j) reducing the ore further in the fluidized-bed reaction zone at a temperature between about 800° F. and about 1500° F. and a pressure between 100 and about 1000 p.s.i.g. in the presence of a reducing gas;

(k) recovering unused reducing gas and recycling said unused gas to said helical tubular heating zone and said fluidized-bed reaction zone.

References Cited
UNITED STATES PATENTS

| | | | |
|---|---|---|---|
| 2,441,594 | 5/1948 | Ramseyer | 75—26 X |
| 3,224,870 | 12/1965 | Johnson et al. | 75—26 |
| 3,446,590 | 5/1969 | Michal et al. | 75—1 |
| 3,160,498 | 12/1964 | Olt | 75—35 |

L. DEWAYNE RUTLEDGE, Primary Examiner

M. J. ANDREWS, Assistant Examiner

U.S. Cl. X.R.

75—26, 35